May 8, 1962
E. J. BETHE ETAL
3,032,828
PROCESS OF MAKING FABRIC-FOAM LAMINATES
Filed March 29, 1960
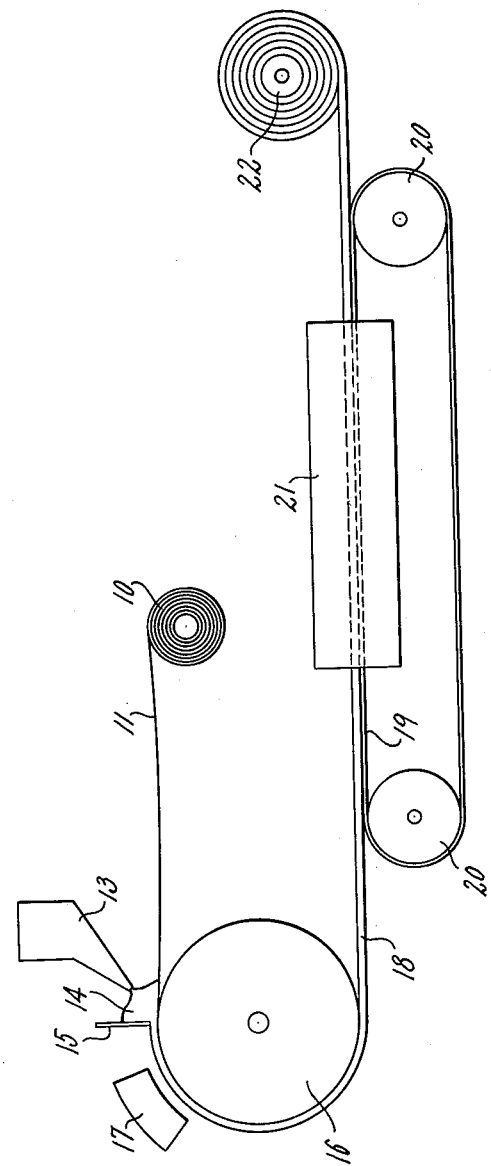
INVENTORS
EUGENE J. BETHE
EDMUND J. GUNTER
BY
ATTORNEY

3,032,828
PROCESS OF MAKING FABRIC-FOAM LAMINATES

Eugene J. Bethe and Edmund J. Gunter, Mishawaka, Ind., assignors to United States Rubber Company, a corporation of New Jersey
Filed Mar. 29, 1960, Ser. No. 18,421
3 Claims. (Cl. 18—59)

This invention relates to a process of making fabric-foam laminates, and more particularly a latex foam backed fabric in which the fabric is substantially smooth and free of wrinkles.

Generally, wrinkles in such fabrics result from the fact that foam shrinks considerably more than the fabric during gelation and curing. In the manufacture of fabric foam laminates, liquid latex foam is applied to the surface of a fabric, so that the foam may penetrate into the fabric interstices and eventually form a secure bond therewith. When the latex foam gels and is subsequently cured, as it shrinks it tends to pull or draw the fabric with it and the excess fabric is necessarily taken up in the form of wrinkles.

Inasmuch as laminates of latex foam and fabric are important for such applications as decorative fabrics, automobile upholstery and slipper in-soles, certain methods have been developed for producing wrinkle-free foam-fabric laminates.

Some methods which are commonly used require a cementing operation in which the foam laminate is produced separate from the fabric and then the foam is cemented to the fabric. This type of method is not completely satisfactory because it requires the use of cement, introducing a problem of adhesion. It is preferable however to have the bond between foam and fabric formed by the foam penetrating into the interstices of the fabric and becoming united with the fabric.

A more desirable method, insofar as it eliminates the use of cement, features the step of pouring latex foam over a smooth carrier or belt. The fabric which is to be united with this foam is applied uniformly on top of this foam and subsequently, during gelation (or solidification), the foam unites with this fabric. In this method, fabric shrinkage is prevented by maintaining the fabric in tension.

An object of this invention is to provide a substantially wrinkle-free foam-fabric laminate.

A second object of this invention is to provide a simpler and improved process for making substantially wrinkle-free foam-fabric laminates while avoiding the necessity of maintaining the fabric in substantial tension during the gelation and curing stages.

A still further object is to eliminate the necessity of placing the fabric over the liquid foam in order to simplify the manufacturing process.

Other objects and advantages of this invention will become apparent from the following description taken in connection with the accompanying drawing wherein is set forth, by way of illustration and example, an embodiment of this invention.

Generally, it may be said that the improved invention requires the steps of depositing a foam latex layer in liquid state on top of the fabric to which it will be united while the fabric is supported on a large curved surface in a substantially taut condition. The fabric and foam, which is still in liquid state, are advanced over the curved path defined by this surface. While the foam and fabric are on the curved surface, the foam is gelled rapidly to prevent the foam, as a liquid, from sliding down the curved surface. The fabric and foam are then placed in contact with a carrier belt of suitable elastomeric material, the foam being faced downward and in contact with the belt so that it lies between the carrier belt and the fabric. The carrier belt then brings the composite foam-fabric through a heating unit to vulcanize the latex foam while it is in contact with the carrier belt.

As shown in the drawing, the fabric 11 on which the latex foam is to be applied is entrained, in a relaxed condition, over a rotating cylinder 16 from a feeder mechanism 10. This mechanism is a simple unwind having only enough tension to keep the fabric wrinkle-free. A latex foam dispenser 13 deposits on the fabric 11 a relatively even layer of latex in liquid state by the use of a spreader or doctor blade 15. This foam is deposited on top of the fabric surface at a position before the fabric has been curved substantially by being entrained over the cylinder 16. In order to prevent coagulation at the doctor interface with the foam stock, the spreader blades may be periodically cleaned. Any conventional latex frothing means, such as a Keen Frothers, may be used to produce the latex. This frothed latex is fed through a hose which is continuously oscillating transversely of the belt to produce a uniform deposit. Double spreaders are preferred to produce uniform stock thickness.

It is to be noticed that the length of the liquid latex that is applied over the fabric layer is somewhat greater than the length of the fabric because of the difference between the center of the drum to the fabric (hereinafter referred to as the radius of the fabric) and from the center of the drum to the foam (hereinafter referred to as the radius of the foam). While the fabric and the liquid latex are still on the drum, heat is applied to the foam by means of a conventional heating means to bring it to a gelled state. Inasmuch as rapid gelation is a requisite, heat from both sides of the drum surface is preferred to a single heating unit positioned outside the cylinder surface. The heating is applied as soon as possible after the fabric passes over the doctor blade 15 to prevent foam slipping down the curved surface.

The fabric with the gelled foam 18 leaves the curved surface of the rotating drum with the foam side face down. It is then received by a carrier belt 19 which adhesively or frictionally engages the gelled foam and carries it through a curing oven 21. The cured foam fabric laminate is removed from the carrier belt through any conventional means, shown at 22 as a take-up roller. This take-up means functions only to wind the laminate; it does not provide any force which would positively stretch the laminate.

While in the curing oven, the gelled foam has a tendency to shrink. This is prevented to some extent by the frictional engagement of the foam with the carrier belt. The frictional forces between the carrier belt and the foam tend to prevent relative motion between the belt and the gelled foam thereby tending to prevent foam shrinkage. Some pressure normal to the adhering foam-belt surface is necessary, but it is to be noted that this pressure is supplied by the weight of the fabric and foam and no external pressure is required. Since the foam is somewhat greater length than the fabric, it may shrink somewhat without causing any wrinkles in the fabric.

The curing oven may be considered as a conventional curing means; however a dry heat cure has been found to be the most effective in promoting greater frictional engagement between foam and belt after inversion and will also further reduce shrinkage and wrinkling. The frothed latex when applied to the fabric penetrates to some extent into the interstices thereof lodging against and adhering somewhat to the various fabric fibers which define the interstices. The frothed latex at this time is in a watery state, but after curing in a dry oven and the evaporation of the water, the latex adhering to the fabric fibers forms an interlocking bond between the fabric and foam layers.

This invention specifically permits the use of woven fabrics to support the foam, and other non-stretchable fabrics having similar properties are considered within the principles of this invention. While knitted and other stretchable fabrics may be used in the practice of this invention no benefit could be derived since conventional methods are equally satisfactory.

Having thus described our invention, what we claim and desire to protect by Letters Patent is:

1. A process for manufacturing a foam backed fabric laminate comprising the steps of running a non-stretchable fabric over a relatively large rotatable curve surface, depositing a layer of liquid foam latex on top of the fabric surface, advancing the fabric and foam on the curved path defined by the said surface, thereafter gelling the foam while it is on the large curved surface, removing the composite gelled foam fabric from the curved surface and bringing it in contact with a carrier belt so that the foam lies between the carrier belt and the fabric, and subsequently heating and vulcanizing the latex foam while in contact with the carrier belt.

2. A process for manufacturing a uniform, substantially wrinkle-free foam-backed fabric laminate comprising the steps of applying a woven fabric over a relatively large rotatable curved surface, the fabric being unstretched and in a relaxed condition with only sufficient tension to keep it wrinkle-free, depositing a layer of liquid foam latex uniformly on top of the fabric at a region substantially adjacent to the region where the fabric comes in contact with the curved surface, advancing the fabric and foam on the curved path defined by said surface, heating and gelling the foam while it is on the curved surface, removing the composite gelled foam fabric from the curved surface and bringing it in contact with a carrier belt so that the foam lies between the carrier belt and the fabric, and subsequently heating and vulcanizing the latex foam while in contact with the carrier belt.

3. A process for manufacturing a foam backed fabric laminate comprising the steps of entraining a woven fabric over a relatively large curved surface, depositing a layer of liquid foam latex on top of the fabric surface at a position on the said fabric surface before the fabric has been curved substantially by being entrained over the curved surface, advancing the fabric and foam on the curved path defined by the said large curved surface, thereafter gelling the foam while it is on the said large curved surface, whereby the length of foam gelled is somewhat greater than the length of fabric which is in contact with the foam, removing the composite gelled foam fabric from the curved surface and bringing it in contact with a carrier belt so that the foam lies between the carrier belt and the fabric, and subsequently heating and vulcanizing the latex foam while in contact with the carrier belt.

References Cited in the file of this patent
UNITED STATES PATENTS 2,865,046    Bird _____ Dec. 23, 1958

FOREIGN PATENTS 794,454    Great Britain _____ May 7, 1958